United States Patent
Akimoto et al.

(10) Patent No.: US 7,297,357 B2
(45) Date of Patent: Nov. 20, 2007

(54) PROCESS FOR PRODUCING PUFFED SNACK AND PRODUCTION APPARATUS THEREFOR

(75) Inventors: Shuji Akimoto, Sakado (JP); Takahiro Miura, Sakado (JP); Taisuke Yamane, Sakado (JP)

(73) Assignee: Meiji Seika Kaisha, Ltd., Tokyo (JP)

( * ) Notice: Subject to any disclaimer, the term of this patent is extended or adjusted under 35 U.S.C. 154(b) by 643 days.

(21) Appl. No.: 10/416,543

(22) PCT Filed: Mar. 25, 2002

(86) PCT No.: PCT/JP02/02844

§ 371 (c)(1),
(2), (4) Date: May 13, 2003

(87) PCT Pub. No.: WO02/076226

PCT Pub. Date: Oct. 3, 2002

(65) Prior Publication Data

US 2004/0037926 A1   Feb. 26, 2004

(30) Foreign Application Priority Data

Mar. 27, 2001  (JP)  .............................. 2001-089713
Mar. 28, 2001  (JP)  .............................. 2001-093553

(51) Int. Cl.
  *A23P 1/12*  (2006.01)
(52) U.S. Cl. ..................... 426/448; 426/302; 426/516; 426/559

(58) Field of Classification Search ..................... None
See application file for complete search history.

(56) References Cited

U.S. PATENT DOCUMENTS

| 4,748,037 A |   | 5/1988 | Matsumoto et al. |
| 5,132,127 A | * | 7/1992 | Wisdom ..................... 426/549 |
| 6,033,696 A | * | 3/2000 | Aebischer et al. ............ 426/94 |

FOREIGN PATENT DOCUMENTS

| JP | 57-155952 | 9/1982 |
| JP | 63-173543 | 7/1988 |

* cited by examiner

*Primary Examiner*—Lien Tran
(74) *Attorney, Agent, or Firm*—Wenderoth, Lind & Ponack, L.L.P.

(57) ABSTRACT

A method and apparatus for manufacturing puffed snack having a hard surface layer and soft inside, and having a good texture and a difference in color tone between the surface layer and the inside. After spraying a coating liquid or water onto the surface of a dough extruded from an extruder in the form of a rope, the extrudate is dried so that the moisture content of the sprayed extrudate becomes 5 to 12% by weight and then cut. The apparatus used for this manufacturing method comprises a spray device for uniformly spraying the surface of the dough extruded from a nozzle hole of an extruder, a drying device arranged on the downstream side of the driving device, a drawing mechanism comprising belts spanned in a tensioned state so as to clamp the extrudate, a holding cylinder for holding the extrudate and arranged adjacently on the downstream side of the drawing mechanism, and a cutting blade arranged in close proximity to the outlet side opening of the holding cylinder to cut the extrudate.

14 Claims, 11 Drawing Sheets

PROCESS FOR PRODUCING PUFFED SNACK AND PRODUCTION APPARATUS THEREFOR

TECHNICAL FIELD

The present invention relates to a method and apparatus for manufacturing a puffed snack by using an extruder More specifically, the present invention relates to a method and apparatus for manufacturing a puffed snack having a different texture and color tone in the surface layer and the inside.

BACKGROUND ART

A puffed snack produced by using an extruder and using milled grains and flours as ingredients normally has the same nature and color tone in the surface layer and the inside without having any difference therebetween. This is mainly due to the ingredients, and hence the puffed snack is likely to be simple without having any individuality.

As the conventional apparatus for manufacturing a puffed snack, as shown in FIG. 11, there is known one in which a cutting blade D is installed so as to lightly touch the point face of a nozzle hole B provided at the point portion of an extruder A and driven by a motor M, to thereby cut the extruded dough (U.S. Pat. No. 5,435,714).

Further, there is known a manufacturing apparatus in which the dough extruded from a nozzle hole is drawn out by a drawing roll, a blade plate protruding radially or at a right angle with respect to the circumference of the drawing roll is fitted thereto, and the extrudate is made to pass through the drawing roll having the blade plate to thereby cut the extrudate at a right angle with respect to the extruding direction. However, neither of these apparatuses can manufacture a puffed snack having a different texture and color tone in the surface layer and the inside.

It is therefore an object of the present invention to provide a method and apparatus for manufacturing a puffed snack having an improved texture by making the surface layer hard and the inside soft, while giving a difference in color tone between the surface layer and the inside.

SUMMARY OF THE INVENTION

The present inventors have made diligent study regarding the method for manufacturing a puffed snack and as a result have devised the present invention, in which after a coating solution or water is sprayed to a dough extruded from an extruder in the form of a rope, the extrudate is dried until the moisture content of the sprayed extrudate becomes 5 to 12% by weight and is then cut, thereby improving the texture of a puffed snack whose inside is made soft so that a puffed snack having a difference in color tone between the surface layer and the inside can be obtained.

As the extruder used in the manufacturing method according to the present invention, a single-screw extruder or a twin-screw extruder is used, and either of a self-heating type using friction of ingredients and one having a heating apparatus may be used.

The spraying, drying and cutting processing can be carried out in the following manner. That is, the dough extruded from the extruder in the form of a rope is clamped between belts, which are spanned, respectively, in a tensioned state over two pairs of drawing rolls arranged on the opposite sides of the extruding route of the extrudate so as to face each other, and while the extrudate is drawn out therefrom by the drawing rolls, the above processing is carried out. As described above, by providing the drawing process, the flow of the dough extruded from the extruder in the form of a rope after having been extruded can be made smooth. This drawing process may be provided either before the spraying process or after the drying process.

After the cutting process, further drying may be carried out. Thereby, the dough which maintains softness suitable for cutting can be cut into a predetermined shape without getting out of shape, and dried sufficiently depending on the material, to thereby obtain a product having a complete shape.

As the ingredients of the puffed snack used in the present invention, milled grains, starch, root vegetable flours or pulse flours can also be used, and one kind or two or more kinds of these may be mixed. The milled grains include, for example, wheat grains, rye grains, corn grits, and rice grains. Starch includes, for example, wheat flour and corn flour. Root vegetable flours include, for example, potato flour, sweet potato flour, and potato flakes. Pulse flours include, for example, soybean flour, red bean flour, and green peas flour.

As the coating solution sprayed onto the surface of the extrudate, an aqueous solution containing sugar solution, egg liquid, pigment solution or an alkaline solution can be used, and one kind or two or more kinds may be mixed. The concentration of the solid thereof is preferably from 0.1 to 50% by weight. The sugar solution includes, for example, sucrose, glucose, dextrin and starch syrup. As the egg liquid, the whole egg is used, but one obtained by returning a dried egg to the original state with water, or one obtained by returning a frozen egg to the original state may be used. The pigment solution includes, for example, a solution containing one kind or two or more kinds of natural pigments such as anthocyanin, cochineal and turmeric, or fruit juice and vegetable juice. The alkaline solution includes sodium hydroxide, calcium carbonate, potassium carbonate, sodium carbonate, sodium hydrogencarbonate, potassium of phosphates and sodium.

The above cutting may be performed at right angles with respect to the central axis of the extrudate, or may be performed at angles of inclination from 15 to 60 degrees inclusive, with respect to the central axis of the extrudate. Thereby, products having different sizes and shapes of the cutting plane can be obtained from the extrudate having substantially the same diameter, without changing the nozzle diameter of the extruder.

For execution of the manufacturing method of the present invention, an apparatus is used that is constituted of an extruder attached with a die having a nozzle hole provided therein, at the tip portion thereof, a spray device arranged with at least one spray nozzle for uniformly spraying the surface of the rope-shaped dough extruded from the nozzle hole, a drying device arranged adjacent to the spray device on the downstream side of the spraying device, a drawing mechanism comprising belts respectively spanned in a tensioned state so as to clamp the extrudate, over two pairs of drawing rolls arranged on the opposite sides of the extruding route of the extrudate so as to face each other, a holding cylinder for holding the extrudate, arranged at the end on the downstream side of the extruding route of the extrudate, and a cutting blade arranged in close proximity to the outlet side opening of the holding cylinder so as to be able to cut the extrudate.

The cutting blade can be arranged so as to be able to cut at right angles with respect to the central axis of the extrudate, or may be arranged so as to be able to cut at angles of inclination from 15 to 60 degrees inclusive, with respect to the central axis of the extrudate. When the cutting blade is arranged so as to be able to cut at angles of inclination from 15 to 60 degrees inclusive, with respect to the central axis of the extrudate, the cutting plane of the puffed snack becomes larger than that of when the cutting blade is arranged so as to be able to cut at right angles, and the shape thereof becomes different. Hence, the variety of the shape and size of the products can be increased, only by changing the set angle of the cutting blade, without replacing the apparatus with another apparatus.

The drawing mechanism may be arranged either between the drying device and the holding cylinder, or between the extruder and the spray device.

When the cutting blade is arranged so as to be able to cut at angles of inclination from 15 to 60 degrees inclusive, with respect to the central axis of the extrudate, the outlet side opening can be formed in an angle of inclination corresponding to the cutting blade, and can include a cut receiving board integrally formed with the opening. By having this cut receiving board, blurring of the extrudate at the time of cutting the extrudate by the cutting blade can be prevented.

The apparatus may not include the spray device and the drying device, depending on the materials of the puffed snack and conditions such as temperature and the like.

DETAILED DESCRIPTION OF THE INVENTION

Figure 1:
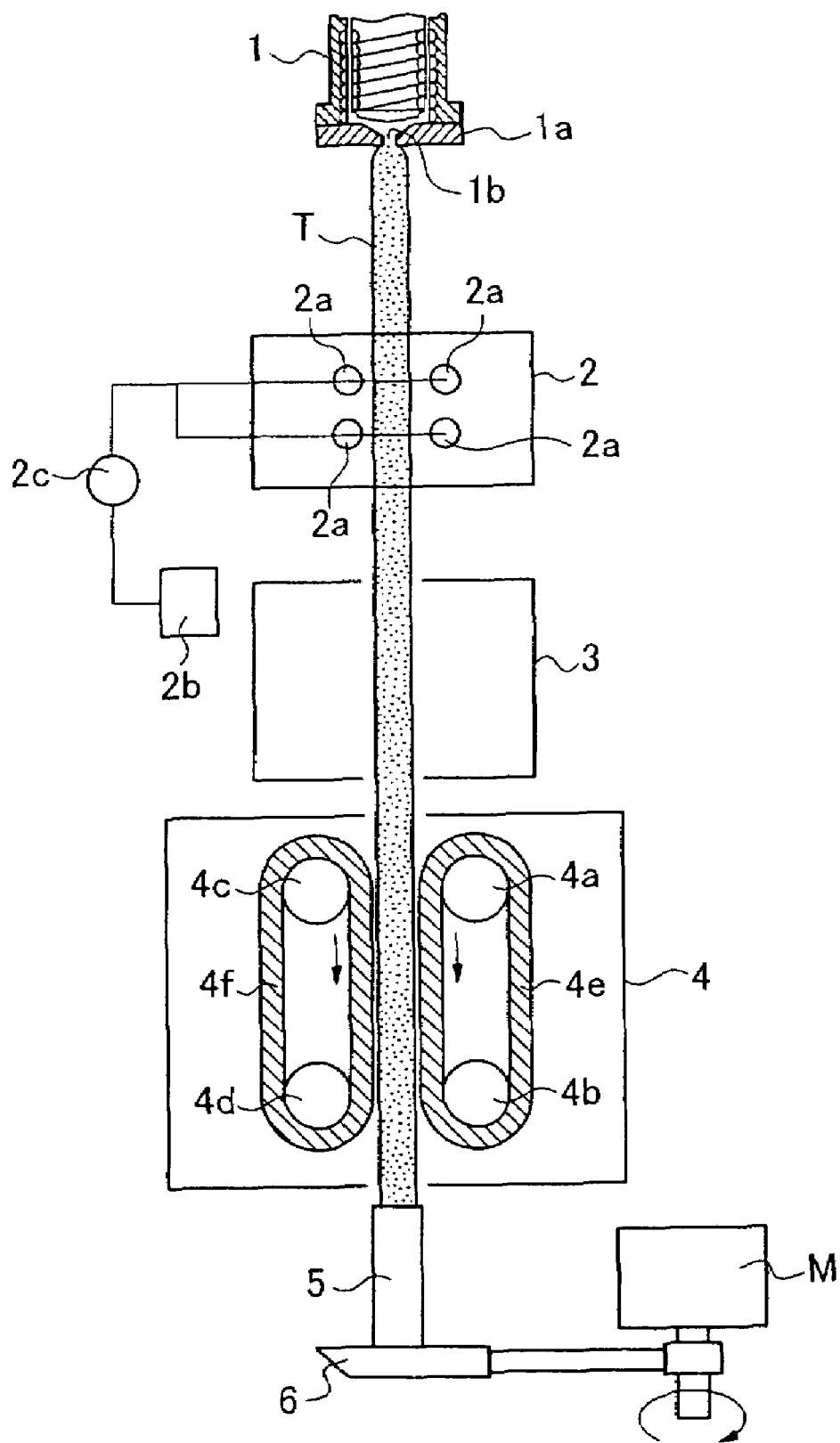
FIG. 1 is a schematic longitudinal sectional view of a puffed snack manufacturing apparatus according to a first preferred embodiment, using a single-screw extruder used for the method of the present invention.

The present invention will now be described in detail, with reference to the accompanying drawings. FIG. 1 shows a first embodiment relating to a puffed snack manufacturing apparatus, which uses a single-screw extruder used for the manufacturing method of the present invention. This manufacturing apparatus comprises an extruder 1 attached with a die 1a having a nozzle hole 1b provided therein, at the tip portion thereof, a spray device 2 arranged with a spray nozzle 2a for uniformly spraying the surface of a rope-shaped dough T extruded from the nozzle hole 1b, a drying device 3 arranged adjacent to the spray device 2 on the downstream side thereof, a drawing mechanism 4 comprising belts 4e, 4f respectively spanned in a tensioned state so as to clamp the extrudate T, over two pairs of drawing rolls 4a, 4b and 4c, 4d arranged on the opposite sides of the extrudate T so as to face each other, a holding cylinder 5 for holding the extrudate T, arranged adjacent to the drawing mechanism 4 on the downstream side thereof, and a cutting blade 6 arranged in close proximity to the outlet side opening of the holding cylinder 5 so as to be able to cut the extrudate T.

The drawing mechanism 4 has a construction such that the two pairs of drawing rolls 4a, 4b and 4c, 4d are driven by a motor (not shown), and the belts 4e, 4f are made of a flexible plastic, a rubber or the like, so as to prevent the extrudate T from slipping and to supply the extrudate T to the cutting blade 6 in the subsequent step linearly at a constant speed. The cutting blade 6 is arranged at right angles with respect to the central axis of the extrudate T.

In order to manufacture a puffed snack using the above apparatus, the ingredients of the puffed snack are cooked by the extruder 1, and the dough is extruded in the form of a rope continuously from the nozzle 1b of the die 1a attached to the tip portion thereof Then, the extrudate T goes through the spray device 2 and the drying device 3, and is made to pass through the holding cylinder 5 by the drawing mechanism 4 at a certain speed and supplied to the cutting blade 6, and cut here.

A coating liquid or water is sprayed onto the surface of the extrudate T, by using the spray nozzle 2a in the spray device 2, and the surface of the extrudate T is quickly dried in the drying device 3 immediately. The sprayed coating liquid is put into a spray liquid tank 2b, and is sprayed onto the surface of the extrudate T which is passing through the spray device 2 by the use of a feed pump 2c.

The amount of the coating liquid or water to be sprayed is from 1 to 30 parts by weight per 100 parts by weight of the snack. If the amount of the coating liquid or water to be sprayed is less than 1 part by weight, the texture is not improved. If the amount of the coating liquid or water to be sprayed exceeds 30 parts by weight, the water content becomes excessive, and hence the puffed snack is deformed.

It is important to spray uniformly onto the surface of the extrudate T, and hence, it is necessary to spray in the vertical and horizontal directions, at certain positions from a plurality of spray nozzles 2a. If uniform spraying is not performed onto the surface of the extrudate T in the drying step, drying marks are generated on the extrudate T. As a result, the cut and molded products are likely to be bent and broken.

In order to quickly dry the moisture on the surface of the extrudate T in the drying device 3 immediately after the coating liquid or water has been sprayed, a gas burner or a heating element using direct fire or hot blast may be used. At this time, the moisture content in the dried extrudate T should be from 5 to 12% by weight. If the moisture content is less than 5% by weight, the extrudate T becomes brittle, and extruding by the drawing roll mechanism 4 becomes difficult. On the other hand, if the moisture content exceeds 12% by weight, the surface of the dough becomes sticky, which is not desirable. By the above-described spraying of the coating liquid and quick drying, there can be obtained a puffed snack having different texture and color tone in the surface layer and the inside, such that the surface layer is hard and the inside is soft.

Figure 2:
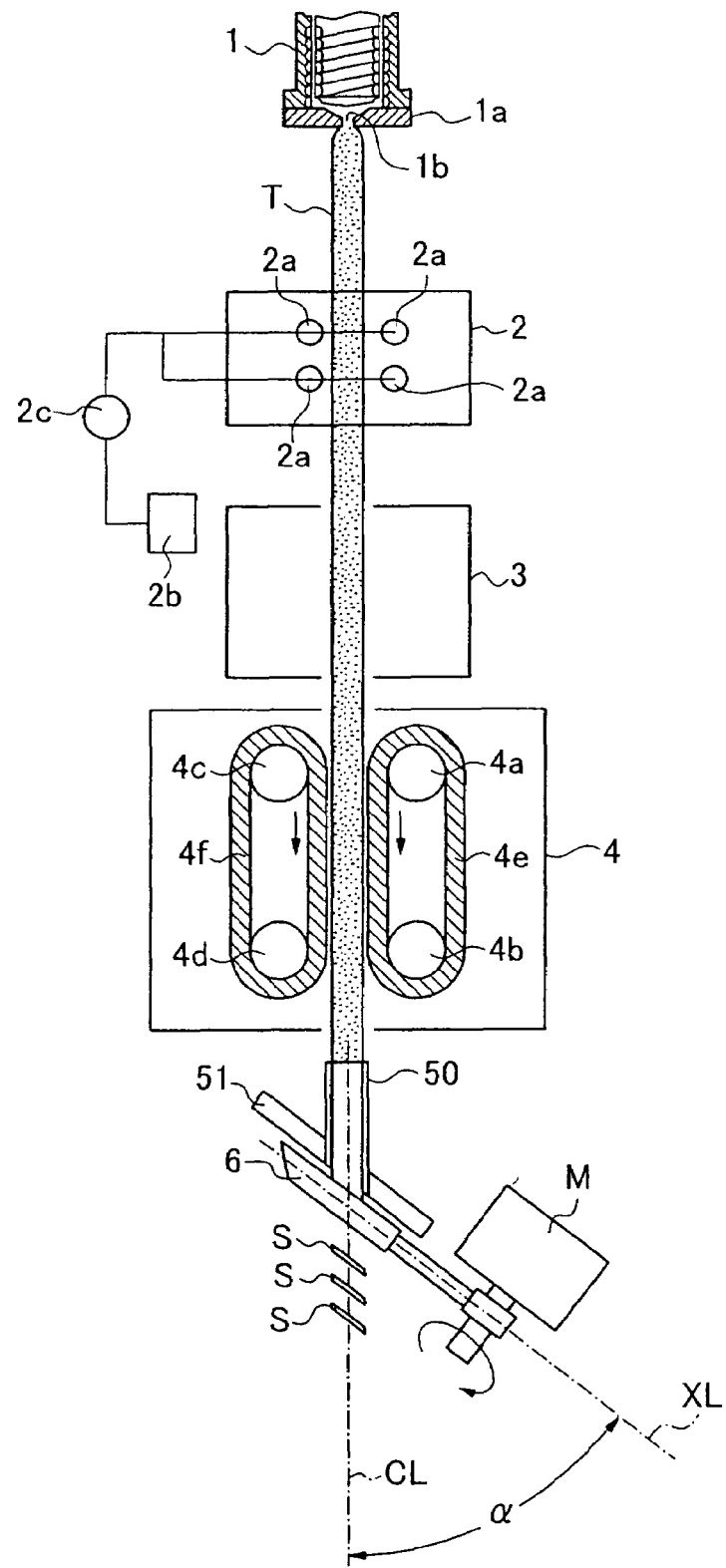
FIG. 2 is a schematic longitudinal sectional view of a puffed snack manufacturing apparatus according to a second embodiment, wherein the cutting blade shown in FIG. 1 is arranged with an angle of inclination with respect to the central axis of the extrudate.

FIG. 2 shows a second embodiment relating to a puffed snack manufacturing apparatus, which uses a single-screw extruder, used for the manufacturing method of the present invention, wherein parts other than a holding cylinder 50 and the cutting blade 6 are the same as in the first embodiment. Hence, the same parts are denoted by the same reference symbols, and the description thereof is omitted.

The cutting blade 6 in this embodiment is arranged at an angle of inclination from 15 to 60 degrees inclusive, with respect to the central axis CL of the extrudate T, and the outlet side opening of the holding cylinder 50 is formed at the same angle of inclination. The cutting blade 6 and the outlet side opening of the holding cylinder 50 are arranged so as to come in light contact with each other. A cut receiving board 51 is integrally fitted to the outlet side opening of the holding cylinder 50. This cut receiving board 51 is fitted to the outlet side opening of the holding cylinder 50, in the form of a doughnut with the same angle of inclination, so that the cutting blade 6 slides on the surface of the cut receiving board 51 at the time of a cutting and rotating operation of the cutting blade 6. By this cut receiving board 51, blurring of the extrudate T at the time of cutting the extrudate T by the cutting blade 6 can be prevented.

The angle α between the central axis CL of the extrudate T and the cutting axis XL of the cutting blade 6 having a drive motor M is from 15 to 60 degrees inclusive. If this angle α is smaller than 15 degrees, the spatial volume in which the cutting blade 6 is driven increases, and hence the workspace becomes too large, which is not desirable. The failure rate of the products in cutting also increases, and hence production efficiency decreases. If the angle α exceeds 60 degrees, the cutting plane is not wide as compared to the case where the dough is cut at right angles.

Figure 3:
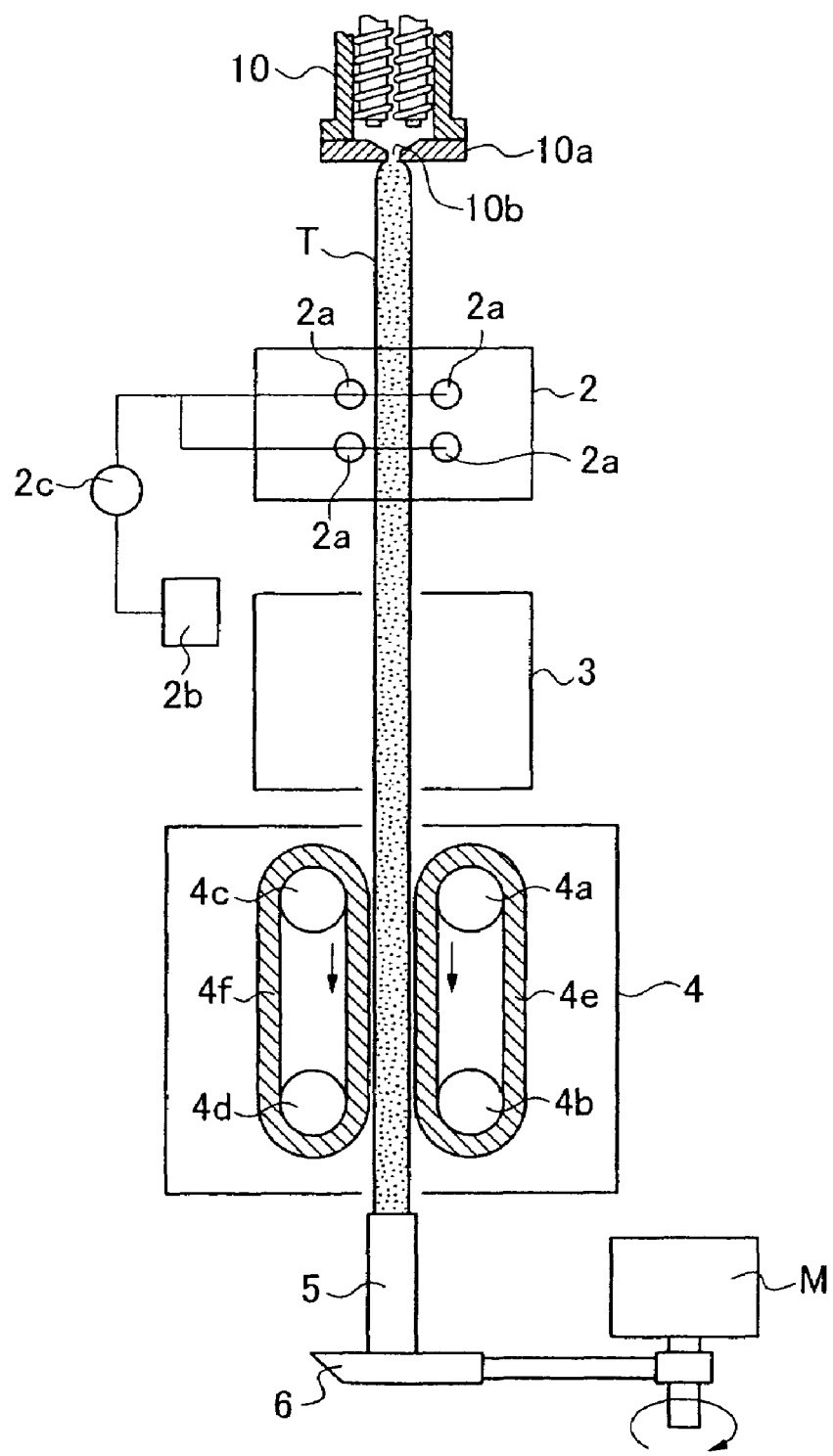
FIG. 3 is a schematic longitudinal sectional view of a puffed snack manufacturing apparatus according to a third preferred embodiment, using a twin-screw extruder used for the method of the present invention.

FIG. 3 shows a third embodiment relating to a puffed snack manufacturing apparatus which uses a twin-screw extruder 10, used for the manufacturing method of the present invention, which is the same as in the first embodiment, except for using a twin-screw extruder 10.

Figure 4:
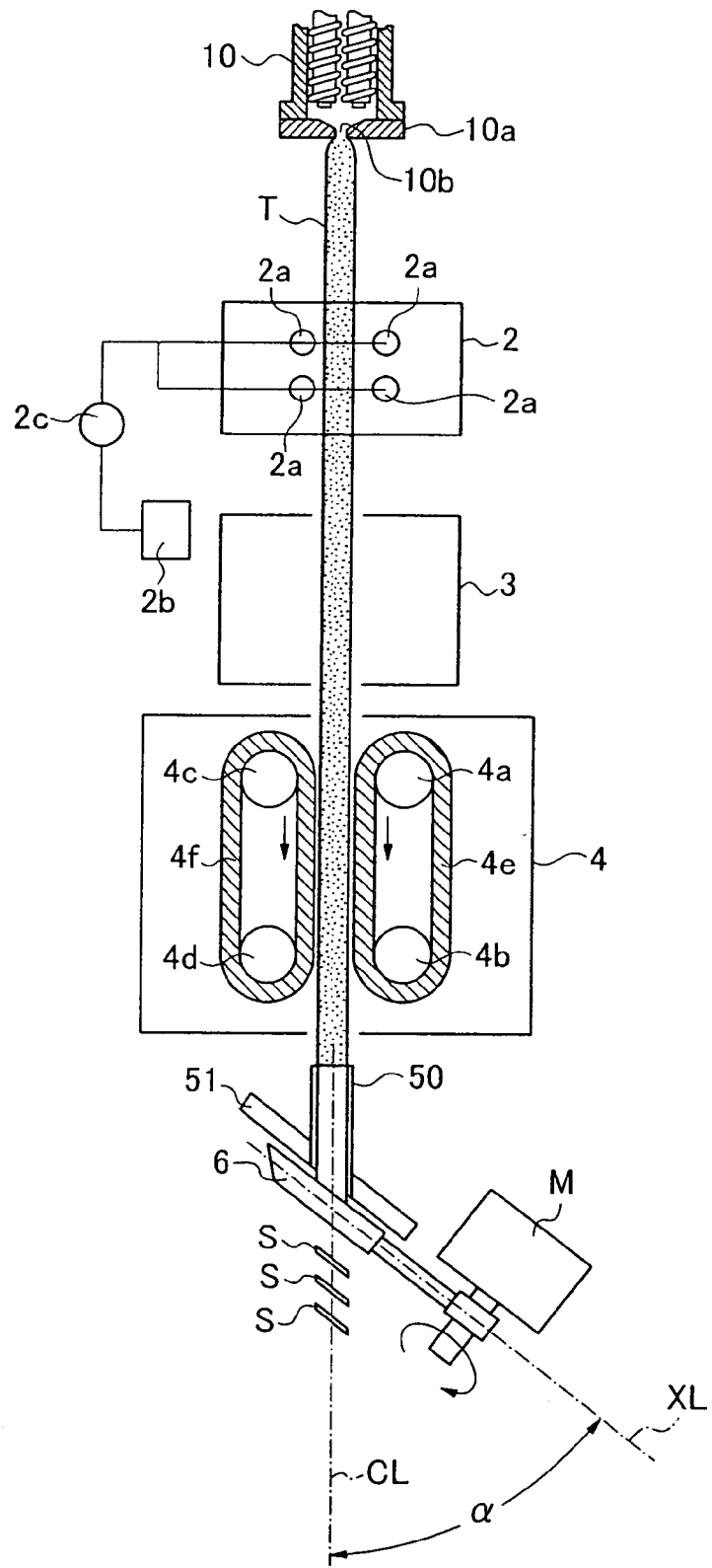
FIG. 4 is a schematic longitudinal sectional view of a puffed snack manufacturing apparatus according to a fourth embodiment, wherein the cutting blade shown in FIG. 3 is arranged with an angle of inclination with respect to the central axis of the extrudate.

FIG. 4 shows a fourth embodiment relating to a puffed snack manufacturing apparatus which uses a twin-screw extruder 10, used for the manufacturing method of the present invention, which is the same as in the second embodiment, except for using the twin-screw extruder 10.

Figure 5:
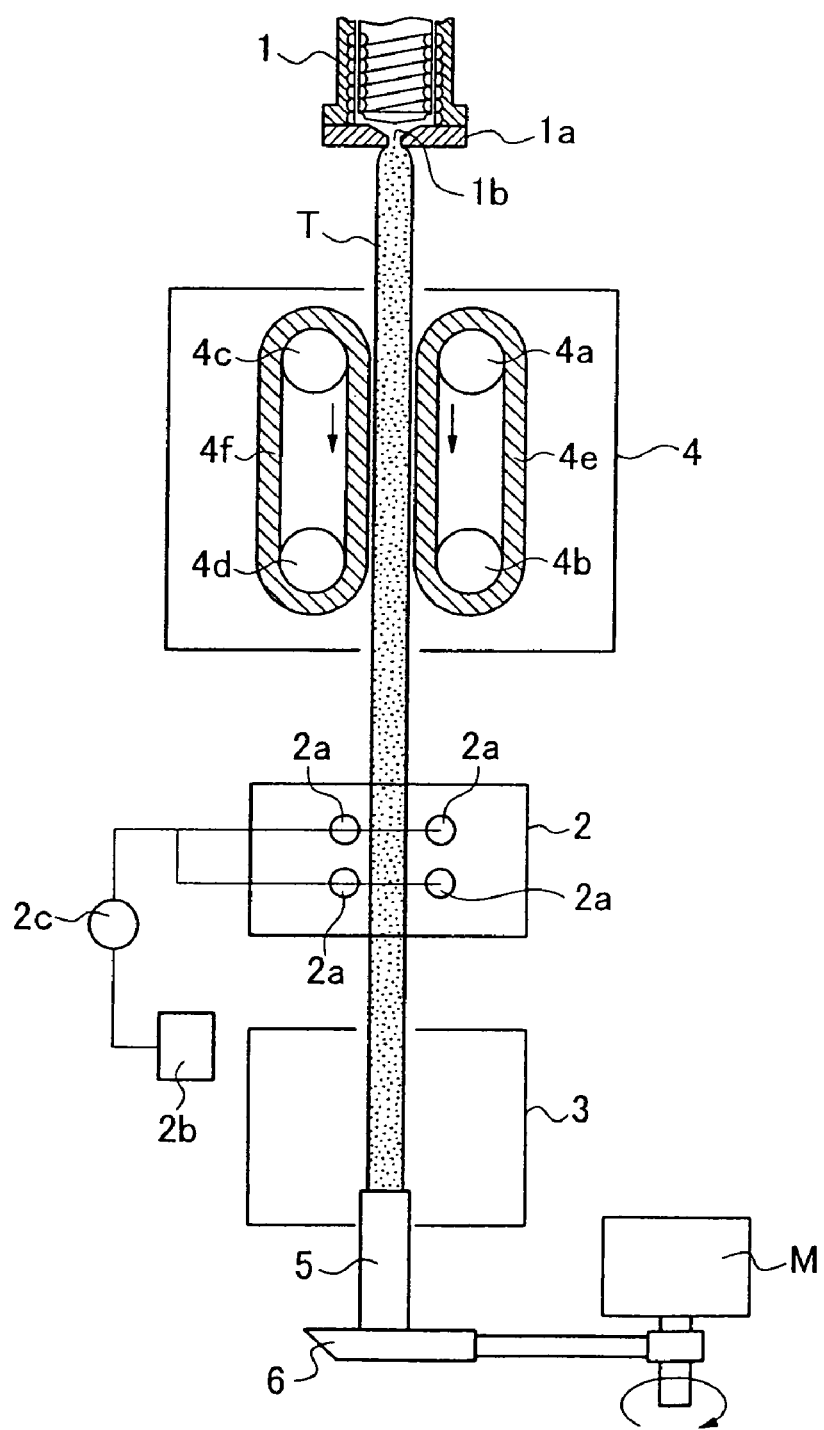
FIG. 5 is a schematic longitudinal sectional view of a puffed snack manufacturing apparatus according to a fifth preferred embodiment, using a single-screw extruder used for the method of the present invention.

FIG. 5 shows a fifth embodiment relating to a puffed snack manufacturing apparatus which uses a single-screw extruder, used for the manufacturing method of the present invention, which is the same as in the first embodiment, except that the drawing mechanism 4 is arranged on the uppermost stream side, that is, between the extruder 1 and the spray device 2.

Figure 6:
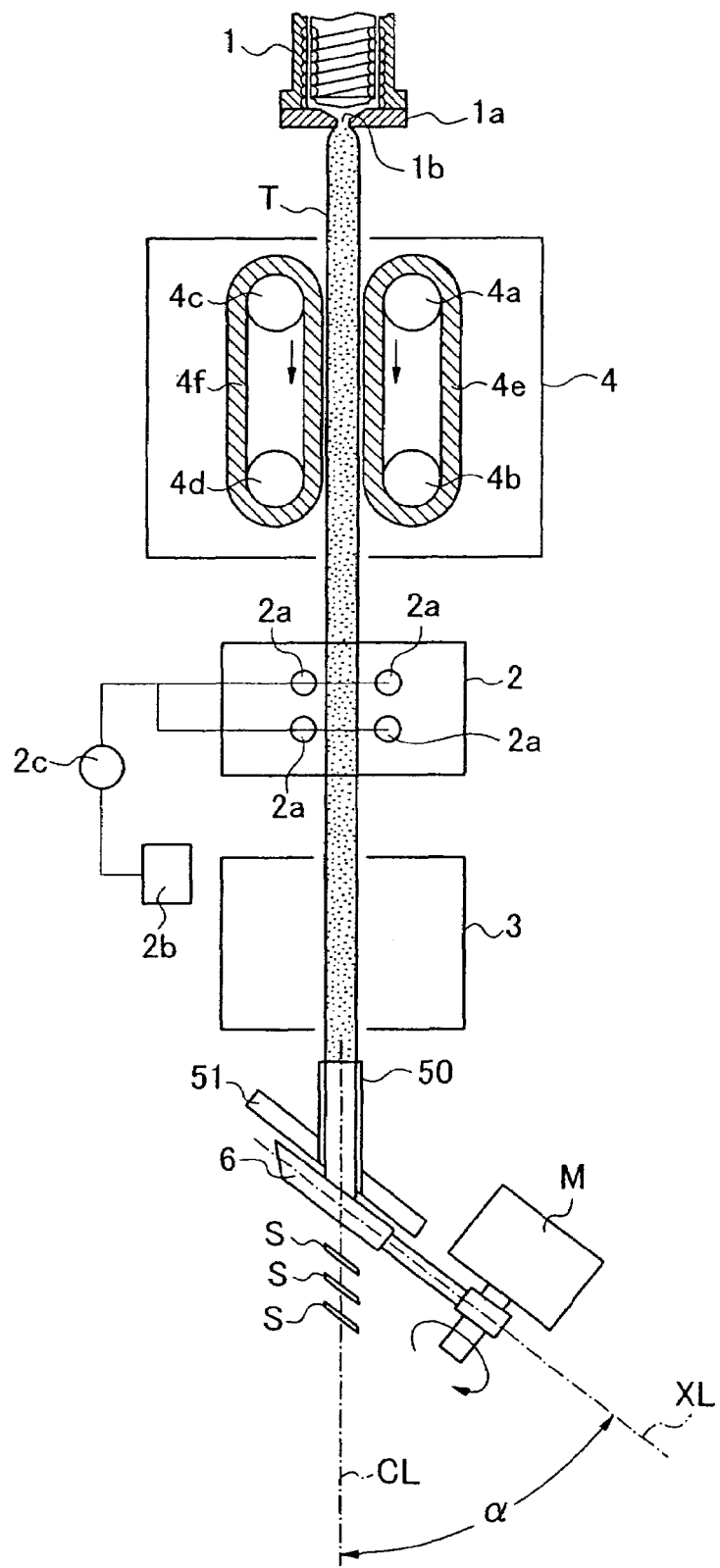
FIG. 6 is a schematic longitudinal sectional view of a puffed snack manufacturing apparatus according to a sixth embodiment, wherein the cutting blade shown in FIG. 5 is arranged with an angle of inclination with respect to the central axis of the extrudate.

FIG. 6 shows a sixth embodiment relating to a puffed snack manufacturing apparatus which uses a single-screw extruder, used for the manufacturing method of the present invention, which is the same as in the second embodiment, except that the drawing mechanism 4 is arranged on the uppermost stream side, that is, between the extruder 1 and the spray device 2. Hence, a detailed description thereof is omitted.

Figure 7:
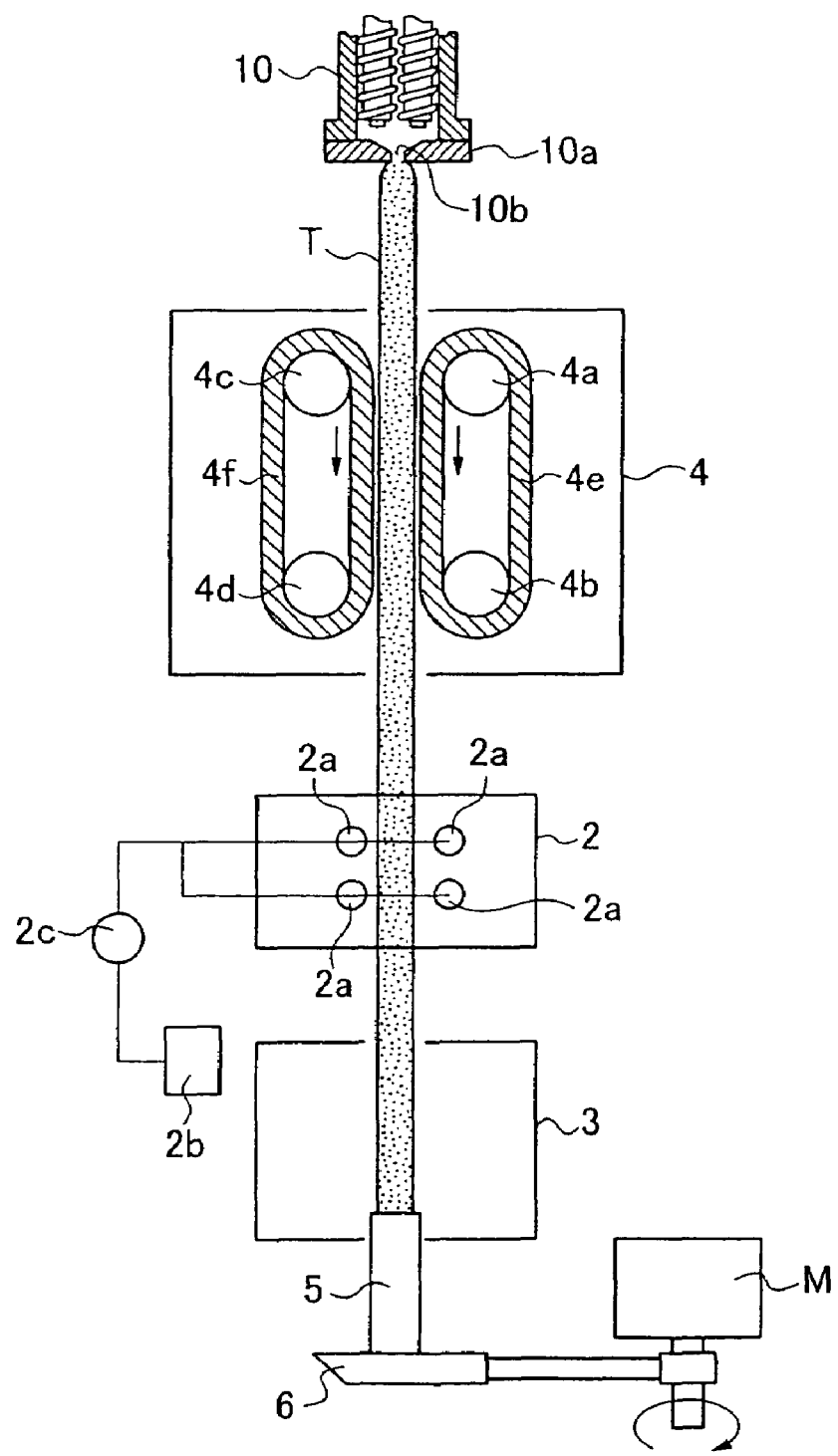
FIG. 7 is a schematic longitudinal sectional view of a puffed snack manufacturing apparatus according to a seventh preferred embodiment, using a twin-screw extruder used for the method of the present invention.

FIG. 7 shows a seventh embodiment relating to a puffed snack manufacturing apparatus which uses a twin-screw extruder, used for the manufacturing method of the present invention, which is the same as in the third embodiment, except that the drawing mechanism 4 is arranged on the uppermost stream side, that is, between the extruder 1 and the spray device 2.

Figure 8:
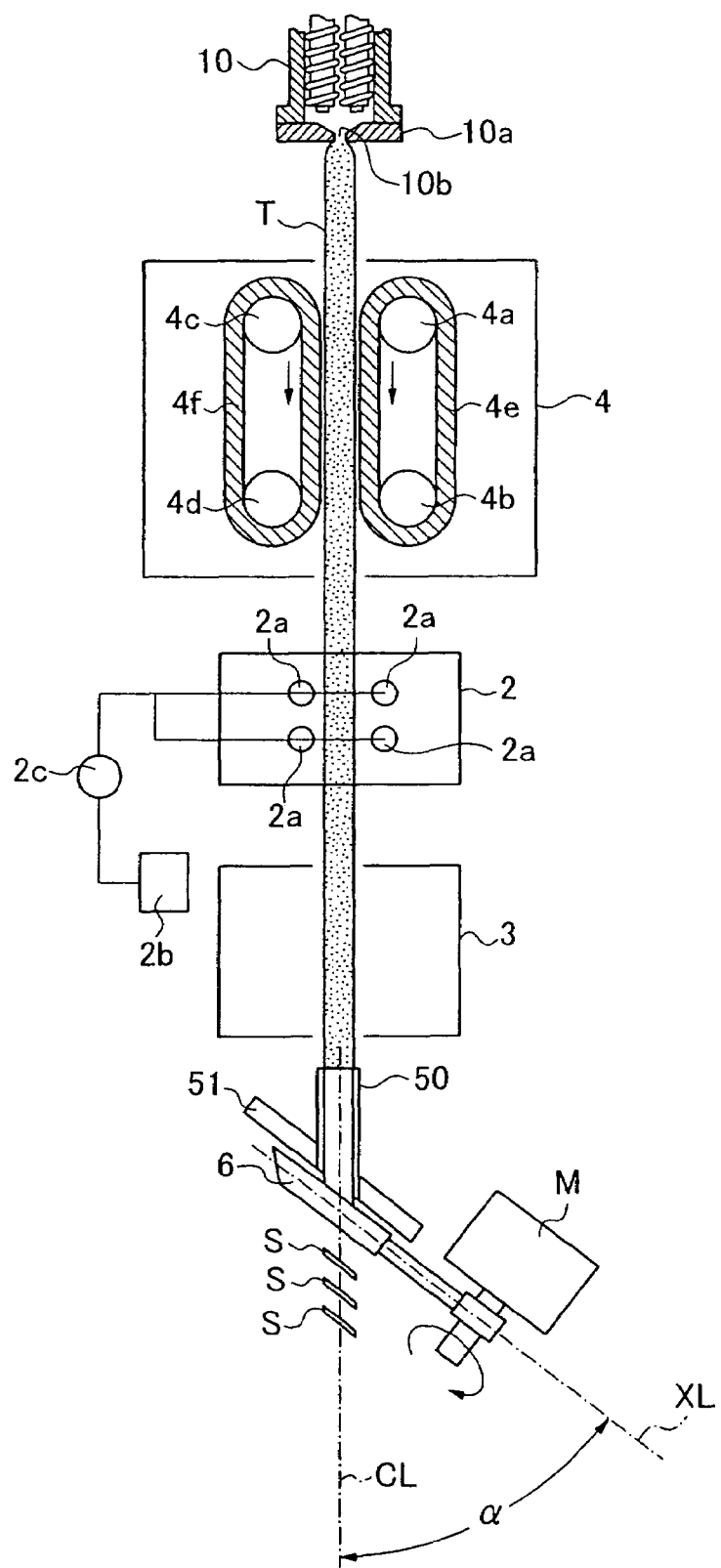
FIG. 8 is a schematic longitudinal sectional view of a puffed snack manufacturing apparatus according to an eighth embodiment, wherein the cutting blade shown in FIG. 7 is arranged with an angle of inclination with respect to the central axis of the extrudate.

FIG. 8 shows an eighth embodiment relating to a puffed snack manufacturing apparatus which uses a twin-screw extruder, used for the manufacturing method of the present invention, which is the same as in the fourth embodiment, except that the drawing mechanism 4 is arranged on the uppermost stream side, that is, between the extruder 1 and the spray device 2.

Figure 9:
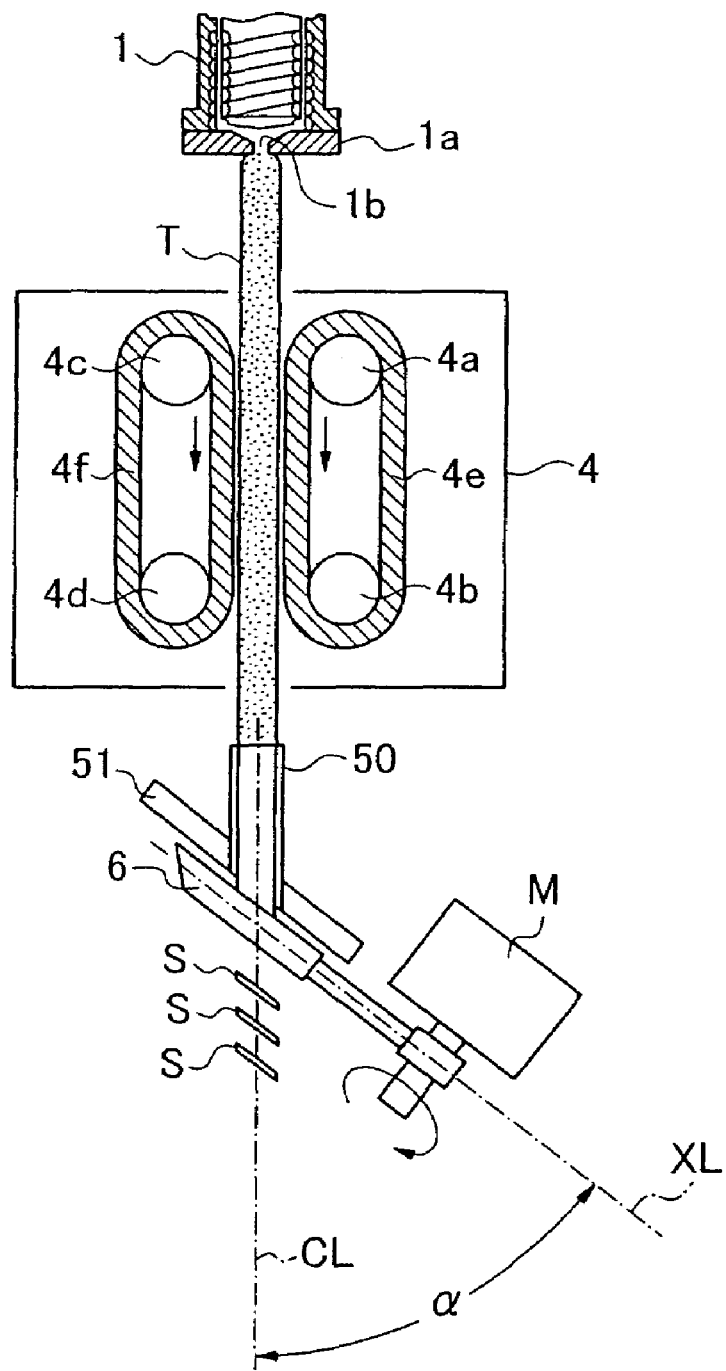
FIG. 9 is a schematic longitudinal sectional view of a puffed snack manufacturing apparatus according to another embodiment, using a single-screw extruder used for the method of the present invention.
Figure 10:
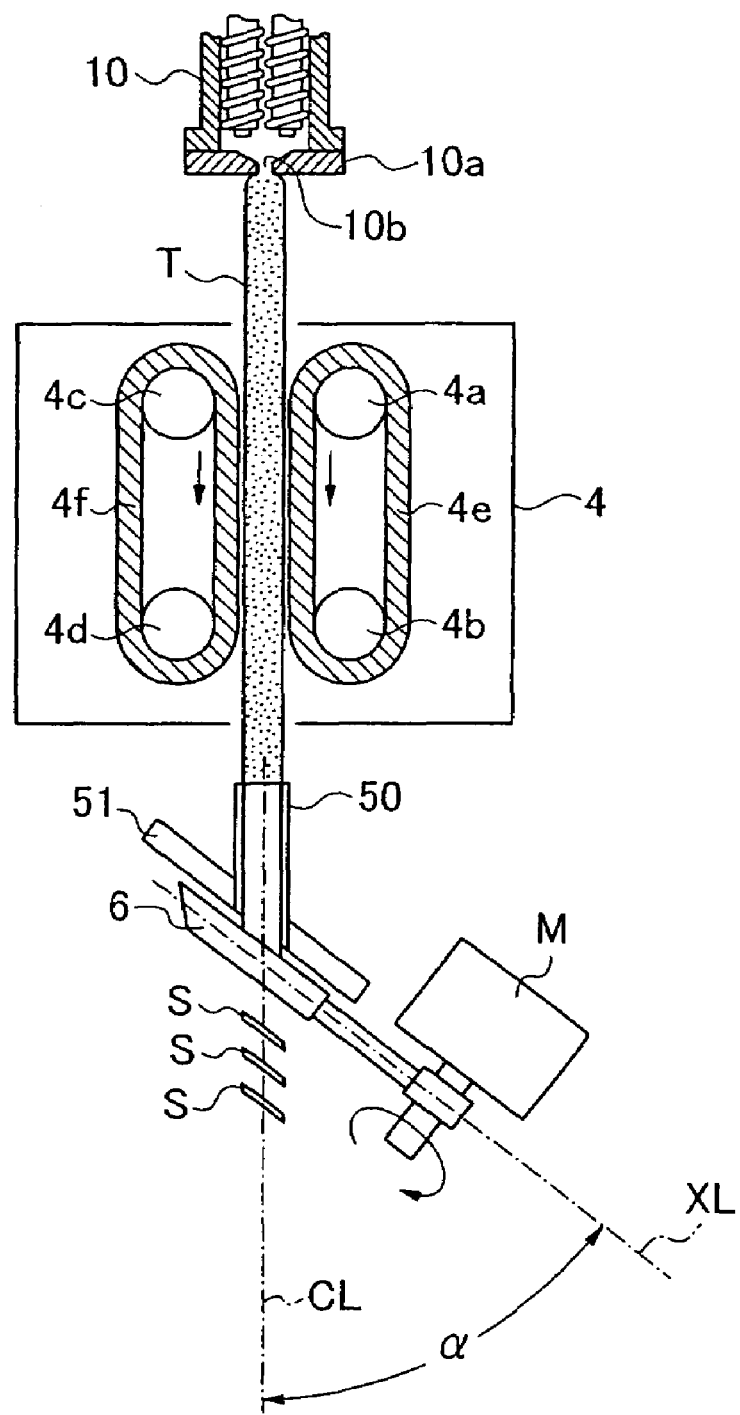
FIG. 10 is a schematic longitudinal sectional view of a puffed snack manufacturing apparatus according to another embodiment, using a twin-screw extruder used for the method of the present invention.

FIG. 9 and FIG. 10 show other embodiments relating to the manufacturing apparatus of the present invention, which are a type of apparatus not having the spray device and the drying device. These apparatus are used in the case where spraying of the coating liquid and drying are not necessary depending on the material of the puffed snack and the environmental temperature or the like.

The method of the present invention using the apparatus according to the above-described embodiments will now be described with reference to manufacturing examples.

MANUFACTURING EXAMPLE 1

Ingredients comprising 75 parts by weight of corn grits and 25 parts by weight of potato flakes were put into a feed port (not shown) of a single-screw extruder 1 (EXL-type machine: manufactured by Aoi Seiki), as shown in FIG. 1. The ingredients were cooked at a rotating speed of 200 r.p.m., and the dough T was extruded from a nozzle 1b having a diameter of 4 mm in a die 1a, and was made to run in the form of a rope at a certain speed via a drawing roll mechanism 4. Four spray nozzles 2a were arranged vertically and horizontally with respect to the moving direction of the extrudate T, in a spray device 2 arranged between a single-screw extruder 1 and the drawing roll mechanism 4. Water was sprayed to the extrudate at a rate of 12 parts by weight per 100 parts by weight of the extrudate T.

The extrudate T sprayed with water was made to proceed to a drying device 3 arranged between the spray device 2 and the drawing roll mechanism 4, and the moisture sprayed onto the surface of the extrudate T was dried by a hot blast of 350° C., so that the moisture content becomes 8.0% by weight. Thereafter, the extrudate T was fed to a holding cylinder 5 through the drawing roll mechanism 4, and was cut into round slices of a length of 10cm by a cutting blade 6. Then, the cut extrudate T was dried by a hot blast of 170° C., so that the moisture content becomes 2.0% by weight. As a result, a puffed snack was obtained in which the surface layer was hard, and the inside was soft.

Further, flavoring oil was separately obtained by mixing 25 parts by weight of a cheese flavoring material per 100 parts by weight of a refined palm oil heated to 60° C. The flavoring oil was poured onto the dried product in an amount of 25 parts by weight per 100 parts by weight of the dried product, to thereby obtain a puffed snack seasoned with cheese.

COMPARATIVE EXAMPLE 1

The ingredients for the puffed snack shown in the Manufacturing Example 1 were put into a feed port (not shown) of a single-screw extruder 1 (EXL-type machine, manufactured by Aoi Seiki) to obtain the extruded dough T by the extruder The extrudate T was directly fed to a cutter in the subsequent step by the drawing roll mechanism, not through the spray device and the subsequent drying device, at a certain speed. Drying and seasoning were performed as in the Manufacturing Example 1, to obtain the puffed snack product.

MANUFACTURING EXAMPLE 2

Ingredients comprising 75 parts by weight of corn grits and 25 parts by weight of potato flakes were put into a feed port (not shown) of a single-screw extruder 1 (manufactured by Aoi Seiki: EXL-type machine), as shown in FIG. 2. The ingredients were cooked at a rotating speed of 200 r.p.m., and dough T was extruded from a nozzle 1b having a diameter of 4 mm in a die 1a, and was made to run in the form of a rope at a certain speed via a drawing roll mechanism 4. Four spray nozzles 2a were arranged vertically and horizontally with respect to the moving direction of the extrudate T, in a spray device 2 arranged between the single-screw extruder 1 and the drawing roll mechanism 4. Water was sprayed to the extrudate at a rate of 12 parts by weight per 100 parts by weight of the extrudate.

The extrudate T sprayed with water was made to proceed to a drying device 3 arranged between the spray device 2 and the drawing roll mechanism 4, and the moisture sprayed onto the surface of the extrudate T was dried by a hot blast of 350° C., so that the moisture content becomes 8.0% by weight. Thereafter, the extrudate T was fed to a holding cylinder 50 through the drawing roll mechanism 4. After the set angle of a cut receiving board 51 and a cutting blade 6 was set to 45 degrees with respect to the central axis CL of the extrudate T, being the extruded direction of the extrudate T, the cutting blade 6 attached to a drive motor M of the cutting blade 6 was rotated at a speed of 1140 r.p.m., to thereby cut the extrudate T. The thickness of the puffed snack S, i.e. the obtained cut product, was 6 mm.

The cut products were dried by a hot blast of 170° C., so that the moisture content becomes 2.0% by weight. Flavoring oil was separately obtained by mixing 25 parts by weight of a cheese flavoring material per 100 parts by weight of a refined palm oil heated to 60° C. The flavoring oil was poured onto the dried product in an amount of 25 parts by weight per 100 parts by weight of the dried product, to thereby obtain a puffed snack seasoned with cheese.

MANUFACTURING EXAMPLE 3

Ingredients for a puffed snack comprising 70 parts by weight of flour, 20 parts by weight of wheat starch, 2 parts by weight of palm oil, 5 parts by weight of lactose and 0.4 part by weight of salt were put into a feed port (not shown) of a twin-screw extruder (TM-50B manufactured by Toshiba Kikai). The ingredients were cooked at a barrel temperature of 190° C. and at a rotating speed of 300 r.p.m., and extruded from a nozzle 10b having a diameter of 6 mm in a die 10a to obtain dough T in the form of a rope.

As shown in FIG. 3, four spray nozzles 2a were arranged vertically and horizontally with respect to the moving direction of the extrudate T in a spray device 2 arranged between a twin-screw extruder 10 and the drawing roll mechanism 4. A coating liquid comprising 63 parts by weight of liquid egg having a moisture content of 63% by weight, 20 parts by weight of sugar, 1.5 parts by weight of caramel pigment and 14 parts by weight of water, and having 45% by weight of solid compound, was sprayed from the four spray nozzles 2a to the rope-shaped extrudate T at a rate of 10 parts by weight per 100 parts by weight of the extrudate T. Thereafter, the extrudate was dried by a drying device 3 having a gas burner attached thereto, and the moisture in the sprayed coating liquid was transpired to make the moisture content 8.5% by weight.

Subsequently, the extrudate T was fed to a holding cylinder 5 via the drawing roll mechanism 4 at a certain speed, and cut by a cutting blade 6. After having been cut, the cut products were dried again by a hot blast of a gas oven with the temperature in the furnace being set to 140° C., to thereby make the moisture content 2.0% by weight. The texture and color tone of the puffed snack obtained here was different in the surface layer and the inside, such that the surface layer was hard and the inside was soft.

Flavoring oil was separately obtained by mixing 20 parts by weight of a flavoring material containing butter per 100 parts by weight of a refined palm oil heated to 60° C. The flavoring oil was poured onto the dried product in an amount of 20 parts by weight per 100 parts by weight of the dried product, to thereby obtain a puffed snack seasoned with butter.

COMPARATIVE EXAMPLE 2

The ingredients for the puffed snack shown in the Manufacturing Example 3 were put into a feed port of a twin-screw extruder (manufactured by Toshiba Kikai, TM-50B). The ingredients were cooked at a barrel temperature of 200° C. and at a rotating speed of 300 r.p.m. to obtain dough, and the obtained dough was directly fed in the form of a rope to a cutting blade in the subsequent step by the drawing roll mechanism, not through the spray device 2 and the subsequent drying device 3, at a certain speed. Drying and seasoning were performed as in the Manufacturing Example 3, to obtain the puffed snack product.

COMPARATIVE TEST EXAMPLE 1

The rupture stress of the puffed snacks obtained in the Manufacturing Example 1 and Manufacturing Example 3 was measured for 20 samples each, by a cylindrical plunger having a diameter of 15mm, using a rheometer (NR-2010J-CW type manufactured by Fudoh Kogyo K.K.). The results are shown in Table 1 below. The rupture stress of the puffed snack obtained in the Manufacturing Example 1 was $32.19 \times 10^3$ Pa, which was 1.29 times as large as that of the puffed snack obtained in the Comparative Example 1 ($24.97 \times 10^3$ Pa), and the rupture stress of the puffed snack obtained in the Manufacturing Example 3 was $22.19 \times 10^3$ Pa, which was 1.25 times as large as that of the puffed snack obtained in the Comparative Example 2 ($17.75 \times 10^3$ Pa). This means that the rupture stress increases significantly, as compared with the Comparative Examples, being the conventional manufacturing method.

TABLE 1

| | Rupture stress (n = 20) Mean value ± standard deviation (×10³ Pa) |
|---|---|
| Comparative Example 1 | 24.97 ± 5.11 |
| Manufacturing Example 1 | 32.19 ± 5.84*[1] |
| Comparative Example 2 | 17.75 ± 3.43 |
| Manufacturing Example 3 | 22.19 ± 4.49*[2] |

*[1]Significance level is P < 0.01, and there is a significant difference, compared with Comparative Example 1.
*[2]Significance level is P < 0.01, and there is a significant difference, compared with Comparative Example 2.

COMPARATIVE TEST EXAMPLE 2

Puffed snacks obtained in the Manufacturing Example 1 and Comparative Example 1 were tasted by 20 professional panelists, to test the acceptability. It was investigated which was preferred, the product obtained in the Manufacturing Example 1, in which the surface layer was hard and the inside was soft, and the product obtained in the Comparative Example 1, in which the surface layer and the inside had the same nature. As a result, 18 panelists answered that they liked the product obtained in the Manufacturing Example 1. Thereby, it was confirmed with the significance level (P) of 5% that the product having a hard surface layer and soft inside was preferred.

MANUFACTURING EXAMPLE 4

Ingredients of a puffed snack comprising 100 parts by weight of flour, 3 parts by weight of palm oil, 5 parts by weight of sugar and 0.5 part by weight of salt were put into a feed port (not shown) of a twin-screw extruder (TM-50B manufactured by Toshiba Kikai). The ingredients were cooked at a barrel temperature of 200° C. and at a rotating speed of 300 r.p.m., and the obtained dough T was extruded from a nozzle 10b having a diameter of 8mm in a die 10a in the form of a rope at a certain speed.

As shown in FIG. 4, four spray nozzles 2a were arranged vertically and horizontally with respect to the moving direction of the extrudate T, in a spray device 2 arranged between a twin-screw extruder 10 and a drawing roll mechanism 4. A coating liquid obtained by adding water to 1.5% by weight of Nichinoh Color RNS (annatto pigment) (solid content: 0.1% by weight) and 10.9% by weight of sugar so as to have 11% by weight of solid compound, was sprayed from the four spray nozzles 2a to the extrudate T, at a rate of 10 parts by weight per 100 parts by weight of the extrudate T.

The extrudate T sprayed with the coating liquid was dried by a drying device 3 having a gas burner attached thereto, the moisture in the sprayed coating liquid was transpired to make the moisture content 8.0% by weight, and the extrudate T was fed to a holding cylinder 50 via the drawing roll mechanism 4. After the set angles of a cut receiving board 51 and a cutting blade 6 were set to 15 degrees with respect to the central axis CL of the extrudate T, being the extruded direction of the extrudate T, the extrudate T was cut by the cutting blade 6. After having been cut, the cut product was dried again by a hot blast of 170° C., to make the moisture content 2.0% by weight. The texture and color tone of the obtained puffed snack were different in the surface layer and the inside, such that the surface layer was hard and the inside was soft.

Separately, seasoning oil was obtained by mixing 20 parts by weight of a flavoring material containing butter per 100 parts by weight of a refined palm oil heated to 60° C. The flavoring oil was poured onto the dried product in an amount of 20 parts by weight per 100 parts by weight of the dried product, to season the puffed snack with butter.

MANUFACTURING EXAMPLE 5

Ingredients of a puffed snack comprising 73 parts by weight of flour, 17 parts by weight of wheat starch, 2 parts by weight of palm oil, 5 parts by weight of lactose and 0.4 part by weight of salt were put into a feed port (not shown) of a single-screw extruder (manufactured by Aoi Seiki: EXL-type machine). The ingredients were cooked at a barrel temperature of 190° C. and at a rotating speed of 300 r.p.m. and extruded in the form of a rope from a nozzle 1b having a diameter of 6 mm in a die 1a, to thereby obtain the dough T.

Figure 11:
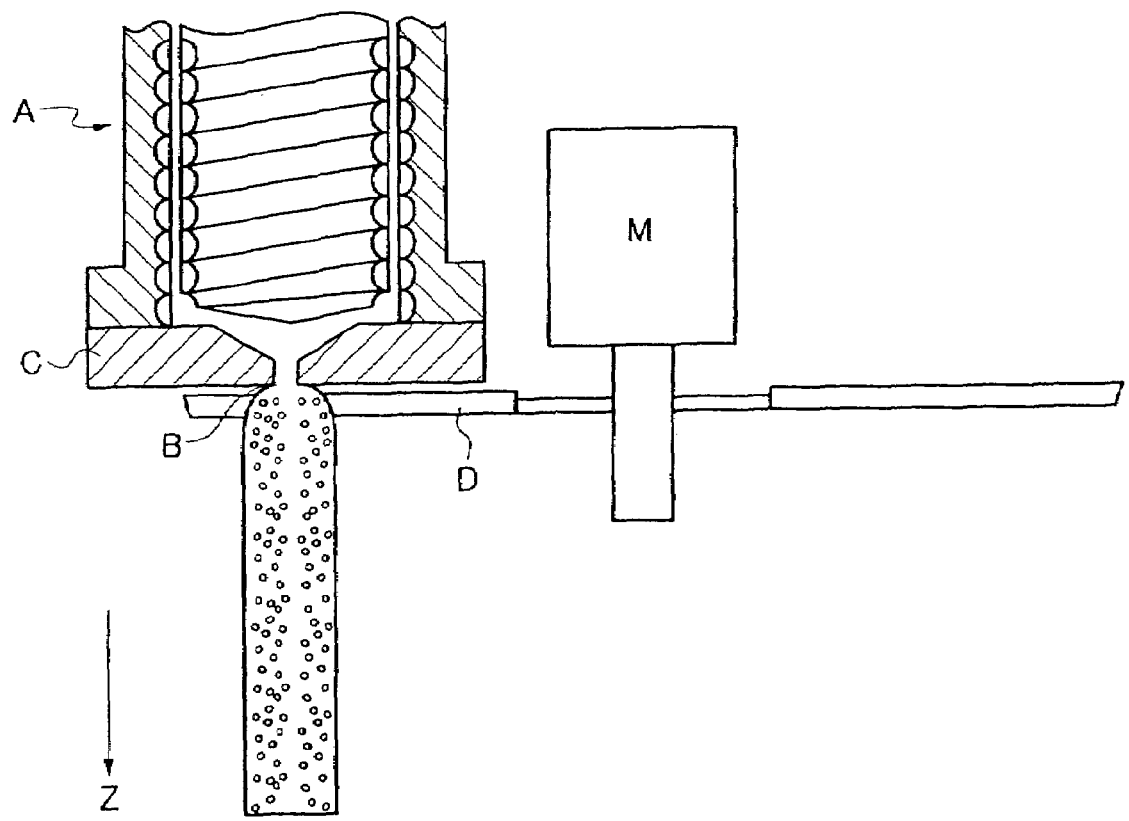
FIG. 11 is a schematic longitudinal sectional view of a conventional puffed snack manufacturing apparatus, using a single-screw extruder.

As shown in FIG. 11, the extruded dough T was drawn via a drawing roll mechanism 4 at a certain speed. A coating liquid comprising 63 parts by weight of liquid egg having a moisture content of 63% by weight, 20 parts by weight of sugar, 1.5 parts by weight of caramel pigment and 14 parts by weight of water, and having 45% by weight of solid compound was sprayed onto the rope-shaped extrudate at a rate of 10 parts by weight per 100 parts by weight of the extrudate T from four spray nozzles 29. Thereafter, the extrudate T was dried by a drying device 3 having a gas burner attached thereto, and the moisture in the sprayed coating liquid was transpired to make the moisture content 8.5% by weight.

Subsequently, the extrudate T was fed to a holding cylinder 5, and cut by the cutting blade 6 at right angles with respect to the central axis of the extrudate T. After having been cut, the product was dried again by a hot blast of a gas oven with the temperature in the furnace being set to 140° C., to thereby make the moisture content 2.2% by weight. The obtained texture and color tone of the puffed snack were different in the surface layer and the inside, such that the surface layer was hard and the inside was soft.

Flavoring oil was separately obtained by mixing 20 parts by weight of a flavoring material containing butter per 100 parts by weight of a refined palm oil heated to 60°; C. The flavoring oil was poured onto the dried product in an amount of 20 parts by weight per 100 parts by weight of the dried product, to thereby obtain a puffed snack seasoned with butter.

MANUFACTURING EXAMPLE 6

Ingredients of a puffed snack obtained by mixing 6 parts by weight of water to 94 parts by weight of corn grits were fed to a single-screw extruder 1 (L/D=3.5, screw diameter =72 mm, nozzle inner diameter =5mm (round shape), manufactured by Aoi Seiki), as shown in FIG. 6, at a rate of 60 kg/hour and at a rotation speed of 220 r.p.m. The mixed ingredients were cooked under conditions of a temperature of goods of 200° C. and a pressure of 6 MPa, to obtain puffed and extruded dough T While the extrudate T was drawn at a certain speed by a drawing mechanism 4, water was sprayed onto the extrudate at a rate of 12 parts by weight per 100 parts by weight of the extrudate by a spray device 2. After the extrudate had been dried by a drying device 3 at 300° C., the extrudate T was fed to a holding cylinder 50. After the angles of the cut receiving board 51 and the cutting blade 6 were set to 30 degrees with respect to the central axis CL of the extrudate T, being the extruded direction of the extrudate T, the cutting blade 6 having a drive motor M attached thereto was rotated at a speed of 590 r.p.m. to thereby cut the extrudate T. The thickness of the puffed snack S, being the obtained cut molded article, was 6 mm, and the moisture content was 8.0% by weight. As a result of measuring the area of the cutting plane, the area was 9.8 cm$^2$. On the other hand, the area of the cutting plane was 4.9 cm$^2$, when the cutting blade was set to 90 degrees with respect to the central axis CL of the extrudate T. As a result, the cut product obtained by the cutting method of the present invention had an area twice as large as that of the cutting plane cut at right angles.

The extrudate T was dried by a hot blast of 170° C., so that the moisture content becomes 2.0% by weight. Flavoring oil was separately obtained by mixing 25 parts by weight of a cheese flavoring material per 100 parts by weight of a refined palm oil heated to 60° C. The flavoring oil was poured onto the dried product in an amount of 25 parts by weight per 100 parts by weight of the dried product, to thereby obtain a puffed snack seasoned with cheese.

MANUFACTURING EXAMPLE 7

Ingredients of a puffed snack comprising 73 parts by weight of flour, 17 parts by weight of wheat starch, 2 parts by weight of palm oil, 5 parts by weight of lactose and 0.4 part by weight of salt were put into a feed port (not shown) of a twin-screw extruder (TM-50B, manufactured by Toshiba Kikai). The ingredients were cooked at a barrel temperature of 190° C. and at a rotating speed of 300 r.p.m., to obtain the dough T extruded in the form of a rope from a nozzle 10b having a diameter of 6 mm in a die 10a.

As shown in FIG. 7, a coating liquid comprising 63 parts by weight of liquid egg having a moisture content of 63% by weight, 20 parts by weight of sugar, 1.5 parts by weight of caramel pigment and 14 parts by weight of water, and having 45% by weight of solid compound, was sprayed from four spray nozzles 2a to the rope-shaped extrudate, at a rate of 10 parts by weight per 100 parts by weight of the extrudate T. Thereafter, the extrudate T was dried by a drying device 3 having a gas burner attached thereto, and the moisture in the sprayed coating liquid was transpired to make the moisture content 8.5% by weight.

Subsequently, the extrudate T was fed to a holding cylinder 5, and cut by a cutting blade 6 at right angles with respect to the central axis of the extrudate T. After having been cut, the product was dried again by a hot blast of a gas oven with the temperature in the furnace being set to 140° C., to thereby make the moisture content 2.2% by weight. The texture and color tone of the obtained puffed snack were different in the surface layer and the inside, such that the surface layer was hard and the inside was soft.

Flavoring oil was separately obtained by mixing 20 parts by weight of a flavoring material containing butter per 100 parts by weight of a refined palm oil heated to 60° C. The flavoring oil was poured onto the dried product in an amount of 20 parts by weight per 100 parts by weight of the dried product, to thereby obtain a puffed snack seasoned with butter.

MANUFACTURING EXAMPLE 8

Ingredients of a puffed snack comprising 73 parts by weight of flour, 17 parts by weight of wheat starch, 2 parts by weight of palm oil, 5 parts by weight of lactose and 0.4 part by weight of salt were put into a feed port (not shown) of a twin-screw extruder (TM-50B, manufactured by Toshiba Kikai). The ingredients were cooked at a barrel temperature of 190° C. and at a rotating speed of 300 r.p.m. to obtain the dough T extruded in the form of a rope from a nozzle 10b having a diameter of 6 mm in a die 10a.

As shown in FIG. 8, the extruded dough T was drawn at a certain speed via a drawing roll mechanism 4 arranged adjacent to the twin-screw extruder. A coating liquid comprising 63 parts by weight of liquid egg having a moisture content of 63% by weight, 20 parts by weight of sugar, 1.5 parts by weight of caramel pigment and 14 parts by weight of water, and having 45% by weight of solid compound, was sprayed from four spray nozzles 2a to the rope-shaped extrudate T, at a rate of 10 parts by weight per 100 parts by weight of the extrudate T. Thereafter, the extrudate T was dried by a drying device 3 having a gas burner attached thereto, and the moisture in the sprayed coating liquid was transpired to make the moisture content 8.5% by weight.

Subsequently, the extrudate T was fed to a holding cylinder 50. After the set angle of a cut receiving board 51 and a cutting blade 6 were set to 60 degrees with respect to the central axis CL of the extrudate T, being the extruded direction of the extrudate T, the extrudate T was cut by the cutting blade 6. After having been cut, the product was dried again by a hot blast of a gas oven with the temperature in the furnace being set to 140° C., to thereby make the moisture content 2.2% by weight. The texture and color tone of the obtained puffed snack were different in the surface layer and the inside, such that the surface layer was hard and the inside was soft.

Flavoring oil was separately obtained by mixing 20 parts by weight of a flavoring material containing butter per 100 parts by weight of a refined palm oil heated to 60° C. The flavoring oil was poured onto the dried product in an amount of 20 parts by weight per 100 parts by weight of the dried product, to thereby season the puffed snack with butter.

COMPARATIVE TEST EXAMPLE 3

Ingredients of a puffed snack comprising 94 parts by weight of flour, 4 parts by weight of sugar, and 2 part by weight of a refined palm oil were fed to a twin-screw extruder (L/D=18, screw diameter=50 mm, nozzle inner diameter=9 mm (cylinder), manufactured by Toshiba Kikai) as shown in FIG. 4, at a rate of 110 kg/hour and at a rotation speed of 200 r.p.m., and water was further added thereto at a rate of 10 kg/hour. The ingredients were cooked under conditions of a temperature of goods of 200° C. and a pressure of 6 MPa, to obtain the puffed dough T extruded in the form of a rope, being circular in section. While being drawn at a certain speed by the drawing roll mechanism 4, the extruded dough T was fed to the holding cylinder 50 without using the spray device 2 and the drying device 3. After the set angle of the cut receiving board 51 and the cutting blade 6 were set to 15, 30, 45 or 60 degrees with respect to the central axis CL of the extrudate T, the extrudate T was cut by rotating the cutting blade 6, having the drive motor M attached thereto, at a speed of 1140 r.p.m. The area of the cutting plane of the obtained puffed snack S was measured. The result is as shown in Table 2, that is, when it is assumed that the area of the cutting plane at the time of setting the set angle of the cutting blade at 90 degrees with respect to the central axis CL of the extrudate T is 100, the area of the cutting plane obtained at the set angle from 15 to 60 degrees becomes from 115 to 385. This means that a puffed snack having a particularly wide area of the cutting plane was obtained.

TABLE 2

| Cutting blade set angle | 15° C. | 30° C. | 45° C. | 60° C. | 90° C. |
|---|---|---|---|---|---|
| Area of cutting plane | 14.6 cm² | 7.6 cm² | 5.5 cm² | 4.4 cm² | 3.8 cm² |
| Area ratio | 385 | 200 | 145 | 115 | 100 |
| Shape of cutting plane | ellipse | ellipse | ellipse | ellipse | circle |

COMPARATIVE TEST EXAMPLE 4

Whether sensible changes occurred in which the visual appearance clearly changed from a circle to an ellipse were studied by 30 panelists using an either-or selection method, by using products obtained in the Comparative Test Example 3 by setting the set angle of the cutting blade to 60 and 90 degrees, and products obtained in the same manner as in the Comparative Test Example 3 by setting the set angle of the cutting blade to 65 degrees. As a result, regarding the products obtained by setting the set angle of the cutting blade to 90 and 65 degrees, 19 panelists responded that the visual appearance clearly changed, wherein the significance level (P) was 5%, and a significant difference was not recognized. With regard to the products obtained by setting the set angle of the cutting blade to 90 and 60 degrees, 24 panelists responded that the visual appearance clearly changed, wherein the significance level (P) was 5%, and a significant difference was recognized.

COMPARATIVE TEST EXAMPLE 5

The failure rate was compared, using products obtained in the Comparative Test Example 3 by setting the set angle of the cutting blade to 30 and 15 degrees, and products obtained in the same manner as in the Comparative Test Example 3 by setting the set angle of the cutting blade to 10 degrees. When it is defined that defective goods in which the appearance of the product is damaged ½ or more are damaged goods, the failure rate is expressed by the following expression:

Failure rate (%)[(number of damaged goods)/(number of products)]×100.

As a result of measuring the failure rate at each set angle, by using 1500 products after having been cut, the failure rate has considerably increased, as shown in Table 3, by setting the set angle of the cutting blade to 10 degrees. In view of the failure rate, it becomes clear that the set angle is desirably 15 degrees or more.

TABLE 3

| Set angle | Failure rate |
|---|---|
| 30 degrees | 0.45 |
| 15 degrees | 1.08 |
| 10 degrees | 18.91 |

MANUFACTURING EXAMPLE 9

Ingredients of a puffed snack comprising 100 parts by weight of flour, 3 parts by weight of palm oil, 5 parts by weight of sugar and 0.5 part by weight of salt were put into a feed port (not shown) of a twin-screw extruder 10 (TM-50B, manufactured by Toshiba Kikai). The ingredients were cooked at a barrel temperature of 200° C. and at a rotating speed of 300 r.p.m., and the obtained dough T was extruded from a nozzle 10b having a diameter of 8 mm in a die 10a in the form of a rope at a certain speed.

As shown in FIG. 3, four spray nozzles 2a were arranged vertically and horizontally with respect to the moving direction of the extruded dough T, in the spray device 2 arranged between the twin-screw extruder 10 and the drawing roll mechanism 4. A coating liquid obtained by adding water to 1.5% by weight of Nichinoh Color RNS (annatto pigment) (solid content: 0.1% by weight) and 10.9% by weight of sugar so as to have 11% by weight of solid compound, was sprayed from the four spray nozzles 2a to the extrudate T, at a rate of 10 parts by weight per 100 parts by weight of the extrudate T.

The extrudate T sprayed with the coating liquid was dried by the drying device 3 having a gas burner attached thereto, the moisture in the sprayed coating liquid was transpired to make the moisture content 8.0% by weight, and the extrudate T was fed to the holding cylinder 5 via the drawing roll mechanism 4 and cut by the cutting blade 6. After having been cut, the product was dried again by a hot blast of 170° C., to make the moisture content 2.0% by weight. The texture and color tone of the obtained puffed snack were different in the surface layer and the inside, such that the surface layer was hard and the inside was soft.

Separately, seasoning oil was obtained by mixing 20 parts by weight of a flavoring material containing butter per 100 parts by weight of a refined palm oil heated to 60° C. The flavoring oil was poured onto the dried product in an amount of 20 parts by weight per 100 parts by weight of the dried product, to season the puffed snack with butter.

MANUFACTURING EXAMPLE 10

Ingredients of a puffed snack comprising 94 parts by weight of flour, 4 parts by weight of sugar, and 2 part by weight of a refined palm oil were fed to a feed port (not shown) of a twin-screw extruder (L/D=18, screw diameter=5mm, nozzle inner diameter=9 mm (cylinder), manufactured by Toshiba Kikai) as shown in FIG. 8, at a rate of 110 kg/hour and at a rotation speed of 200 r.p.m., and water was further added thereto at a rate of 10 kg/hour. The ingredients were cooked under conditions of a temperature of goods of 200° C. and a pressure of 6 Mpa to puff and extrude the dough T in the form of a rope, being circular in section. While being drawn at a certain speed by an drawing roll mechanism 4 arranged adjacent to the twin-screw extruder, the extrudate T was sprayed with water at a rate of 12 parts by weight per 100 parts by weight of the extrudate T, and after having been dried by a drying device 3 at 300° C., the extrudate T was fed to a holding cylinder 50. After the set angle of a cut receiving board 51 and a cutting blade 6 were set to 15, 30, 45 or 60 degrees with respect to the central axis CL of the extrudate T, the extrudate T was cut by rotating the cutting blade 6, having a drive motor M attached thereto, at a speed of 1140 r.p.m. The thickness of the puffed snack S, being the obtained cut product, was 6 mm, and the moisture content was 8.3% by weight.

Separately, seasoning oil was obtained by mixing 20 parts by weight of a flavoring material containing butter per 100 parts by weight of a refined palm oil heated to 60° C. The flavoring oil was poured onto the dried product in an amount of 20 parts by weight per 100 parts by weight of the dried product, to season the puffed snack with butter.

MANUFACTURING EXAMPLE 11

Ingredients of a puffed snack comprising 73 parts by weight of flour, 17 parts by weight of wheat starch, 2 parts by weight of palm oil, 5 parts by weight of lactose and 0.4 part by weight of salt were put into a feed port (not shown) of a single-screw extruder (EXL-type machine, manufactured by Aoi Seiki). The ingredients were cooked at a barrel temperature of 190° C. and at a rotating speed of 300 r.p.m., and extruded from a nozzle 1b having a diameter of 6 mm in a die 1a to thereby obtain the dough T in the form of a rope.

As shown in FIG. 6, the extrudate T was drawn via a drawing roll mechanism 4 arranged adjacent to the single-screw extruder at a certain speed. A coating liquid comprising 63 parts by weight of liquid egg having a moisture content of 63% by weight, 20 parts by weight of sugar, 1.5 parts by weight of caramel pigment and 14 parts by weight of water, and having 45% by weight of solid compound was sprayed onto the extrudate T at a rate of 10 parts by weight per 100 parts by weight of the extrudate T from four spray nozzles 2a. Thereafter, the extrudate was dried by a drying device 3 having a gas burner attached thereto at 300° C., and the moisture in the sprayed coating liquid was transpired to make the moisture content 8.5% by weight.

Subsequently, the extrudate T was fed to a holding cylinder 50, and after the set angle of a cut receiving board 51 and a cutting blade 6 were set to 50 degrees with respect to the central axis CL of extrudate T, being the extruded direction of the extrudate T, the extrudate T was cut by the cutting blade 6. After having been cut, the cut product was dried again by a gas oven with the temperature in the furnace being set to 140° C., to thereby make the moisture content 2.2% by weight. The obtained texture and color tone of the puffed snack were different in the surface layer and the inside, such that the surface layer was hard and the inside was soft.

Flavoring oil was separately obtained by mixing 20 parts by weight of a flavoring material containing butter per 100 parts by weight of a refined palm oil heated to 60° C. The flavoring oil was poured onto the dried product in an amount of 20 parts by weight per 100 parts by weight of the dried product, to thereby obtain a puffed snack seasoned with butter.

MANUFACTURING EXAMPLE 12

Ingredients of a puffed snack comprising 70 parts by weight of flour, 20 parts by weight of wheat starch, 2 parts by weight of palm oil, 5 parts by weight of sugar and 0.4 part by weight of salt were put into a feed port (not shown) of a twin-screw extruder (TM-50B, manufactured by Toshiba Kikai). The ingredients were cooked at a barrel temperature of 190° C. and at a rotating speed of 300 r.p.m., and extruded in the form of a rope from a nozzle 10b having a diameter of 6mm in a die 10a, to thereby obtain the dough T.

As shown in FIG. 3, four spray nozzles 2a were arranged vertically and horizontally with respect to the moving direction of the extrudate T, in the spray device 2 arranged between the twin-screw extruder 10 and the drawing roll mechanism 4. A coating liquid containing 1% by weight of sodium hydroxide (pH 13.1) whose temperature was adjusted to 80° C. was sprayed from the four spray nozzles 2a to the rope-shaped extrudate T, at a rate of 5.5 parts by weight per 100 parts by weight of the extrudate T. Thereafter, the extrudate T was dried by the drying device 3 having a gas burner attached thereto, and the moisture in the sprayed coating liquid was transpired to make the moisture content 8.5% by weight.

Subsequently, the extrudate T was fed to the holding cylinder 5 via the drawing roll mechanism 4 at a certain speed, and cut by the cutting blade 6. After having been cut, the cut product was dried again by a hot blast of a gas oven with the temperature in the furnace being set to 140° C., to thereby make the moisture content 2.0% by weight. The texture and color tone of the puffed snack obtained here were different in the surface layer and the inside, such that the surface layer was dark brown and hard, and the inside was white and soft.

Flavoring oil was separately obtained by mixing 20 parts by weight of a flavoring material containing butter per 100 parts by weight of a refined palm oil heated to 60° C. The flavoring oil was poured onto the dried product in an amount of 20 parts by weight per 100 parts by weight of the dried product, to thereby obtain a puffed snack seasoned with butter.

MANUFACTURING EXAMPLE 13

Ingredients of a puffed snack comprising 70 parts by weight of flour, 20 parts by weight of wheat starch, 2 parts by weight of palm oil, 5 parts by weight of sugar and 0.4 part by weight of salt were put into a feed port (not shown) of a twin-screw extruder (manufactured by Toshiba Kikai, TM-50B). The ingredients were cooked at a barrel temperature of 190° C. and at a rotating speed of 300 r.p.m., and extruded in the form of a rope from a nozzle 10b having a diameter of 6mm in a die 10a, to thereby obtain the dough T.

As shown in FIG. 3, four spray nozzles 2a were arranged vertically and horizontally with respect to the moving direction of the extrudate T in the spray device 2 arranged between the twin-screw extruder 10 and the drawing roll mechanism 4. A coating liquid containing 0.1% by weight of sodium hydroxide (pH 12.1) whose temperature was adjusted to 80° C. was sprayed from the four spray nozzles 2a to the rope-shaped extrudate T, at a rate of 5.5 parts by weight per 100 parts by weight of the extrudate T. Thereafter, the extrudate T was dried by the drying device 3 having a gas burner attached thereto, and the moisture in the sprayed coating liquid was transpired to make the moisture content 8.5% by weight.

Subsequently, the extrudate T was fed to the holding cylinder 5 via the drawing roll mechanism 4 at a certain speed, and cut by the cutting blade 6. After having been cut, the cut product was dried again by a hot blast of a gas oven with the temperature in the furnace being set to 140° C., to thereby make the moisture content 2.0% by weight. The texture and color tone of the puffed snack obtained here were different in the surface layer and the inside, such that the surface layer was light brown and hard, and the inside was white and soft.

Flavoring oil was separately obtained by mixing 20 parts by weight of a flavoring material containing butter per 100 parts by weight of a refined palm oil heated to 60° C. The flavoring oil was poured onto the dried product in an amount of 20 parts by weight per 100 parts by weight of the dried product, to thereby obtain a puffed snack seasoned with butter.

INDUSTRIAL APPLICABILITY

As described above, according to the method and apparatus of the present invention, there can be manufactured a puffed snack having good acceptability and different texture and color tone in the surface layer and the inside, such that the surface layer is hard and the inside is soft.

Since the shape and size can be changed only by changing the fitting angle of the cutting blade, a wide variety of puffed snacks can be produced.

The invention claimed is:

1. A method for manufacturing a puffed snack, said method comprising:
preparing, in an extruder, ingredients of dough to be formed into a puffed snack;
extruding the dough in the form of a rope from the extruder;
spraying a coating solution or water to a surface of the dough extruded from the extruder;
drying the sprayed extrudate until a moisture content of the sprayed extrudate becomes 5 to 12% by weight;
cutting the extrudate to form the puffed snack after said spraying and drying; and
further drying the puffed snack after said cutting.

2. A method for manufacturing a puffed snack according to claim 1, wherein said spraying, drying and cutting are carried out while the dough extruded from the extruder, in the form of a rope, is being clamped between belts which are spanned respectively in a tensioned state over two pairs of drawing rolls arranged on opposite sides of an extruding route of the extrudate so that the belts face each other, and while the extrudate is being drawn out from the belts.

3. A method for manufacturing a puffed snack according to claim 1, wherein main ingredients of the puffed snack are either one kind or a mixture of two or more kinds of milled grains, flours, root vegetable flours and pulse flours.

4. A method for manufacturing a puffed snack according to claim 1, wherein the coating solution is an aqueous solution containing either one kind or two or more kinds of a sugar solution, an egg liquid, a pigment solution and an alkaline solution.

5. A method for manufacturing a puffed snack according to claim 1, wherein said cutting is performed at right angles with respect to a central axis of the extrudate.

6. A method for manufacturing a puffed snack according to claim 1, wherein said cutting is performed at an angle of inclination in a range of 15 to 60 degrees inclusive with respect to a central axis of the extrudate.

7. A method for manufacturing a puffed snack according to claim 2, wherein said cutting is performed at right angles with respect to a central axis of the extrudate.

8. A method for manufacturing a puffed snack according to claim 3, wherein said cutting is performed at right angles with respect to a central axis of the extrudate.

9. A method for manufacturing a puffed snack according to claim 4, wherein said cutting is performed at right angles with respect to a central axis of the extrudate.

10. A method for manufacturing a puffed snack according to claim 2, wherein said cutting is performed at an angle of inclination in a range of 15 to 60 degrees inclusive with respect to a central axis of the extrudate.

11. A method for manufacturing a puffed snack according to claim 3, wherein said cutting is performed at an angle of inclination in a range of 15 to 60 degrees inclusive with respect to a central axis of the extrudate.

12. A method for manufacturing a puffed snack according to claim 4, wherein said cutting is performed at an angle of inclination in a range of 15 to 60 degrees inclusive with respect to a central axis of the extrudate.

13. A method for manufacturing a puffed snack according to claim 2, wherein said method is performed using an apparatus for manufacturing the puffed snack, said apparatus comprising:
said extruder attached with a die having a nozzle hole provided therein, at a tip portion of said die, for extruding a rope-shaped dough therefrom;
a spray device for carrying out said spraying and having at least one spray nozzle for uniformly spraying the surface of the rope-shaped dough extruded from said nozzle hole;
a drying device for carrying out said drying and being arranged adjacent to said spray device on the downstream side of said spray device;
a drawing mechanism comprising said belts spanned in a tensioned state so as to clamp the extrudate, over said two pairs of drawing rolls arranged on the opposite sides of the extruding route of the extrudate so that said belts face each other;
a holding cylinder for holding the extrudate and being arranged at an end on a downstream side of the extruding route of the extrudate; and
a cutting blade for carrying out said cutting and being arranged in close proximity to an outlet side opening of said holding cylinder to cut the extrudate.

14. A method for manufacturing a puffed snack according to claim 1, wherein said method manufactures a puffed snack having a texture and color which are different in a surface layer of the puffed snack and in an inside layer of the puffed snack.

* * * * *